United States Patent
Rauch et al.

(10) Patent No.: US 10,926,312 B2
(45) Date of Patent: Feb. 23, 2021

(54) NICKEL PLATED ZINC ALLOYS FOR COINAGE

(71) Applicant: Artazn LLC, Greer, SC (US)

(72) Inventors: William L. Rauch, Knoxville, TN (US); Carl R. DelSorbo, Greeneville, TN (US); Randy Beets, Bulls Gap, TN (US)

(73) Assignee: ARTAZN LLC., Greer, SC (US)

( * ) Notice: Subject to any disclaimer, the term of this patent is extended or adjusted under 35 U.S.C. 154(b) by 488 days.

(21) Appl. No.: 15/035,283

(22) PCT Filed: Dec. 22, 2014

(86) PCT No.: PCT/US2014/071945
§ 371 (c)(1),
(2) Date: May 9, 2016

(87) PCT Pub. No.: WO2015/095874
PCT Pub. Date: Jun. 25, 2015

(65) Prior Publication Data
US 2016/0288188 A1 Oct. 6, 2016

Related U.S. Application Data

(60) Provisional application No. 61/919,364, filed on Dec. 20, 2013.

(51) Int. Cl.
*H05B 6/02* (2006.01)
*C21D 1/42* (2006.01)
(Continued)

(52) U.S. Cl.
CPC .............. *B21D 22/02* (2013.01); *C21D 1/42* (2013.01); *C22F 1/10* (2013.01); *C25D 3/12* (2013.01);
(Continued)

(58) Field of Classification Search
None
See application file for complete search history.

(56) References Cited

U.S. PATENT DOCUMENTS 190,071 A 4/1877 O'Neill
1,567,625 A 12/1925 Smith
(Continued)

FOREIGN PATENT DOCUMENTS

CN 102899694 A 1/2013
EP 0269006 A2 6/1988
(Continued)

OTHER PUBLICATIONS

Nickel-Alloys.Net, "Copper Alloys—Copper/Nickel Alloys", <https://www.nickel-alloys.net/copper_nickel_alloys.html>, accessed Oct. 18, 2018.*

(Continued)

*Primary Examiner* — Xiaobei Wang
(74) *Attorney, Agent, or Firm* — Eversheds Sutherland (US) LLP (57) ABSTRACT

A lower melting point metal substrate such as zinc is covered with a higher melting point metal layer such as nickel. In order to render the nickel layer suitable for coining without cracking, it is quickly annealed with a burst of induction heat. The induction heat is limited so that only the metal layer is heated without allowing substantial heat transfer to the metal substrate. This protects the metal substrate from any substantial melting, deformation or warping and maintains the metal substrate substantially intact and without a change in properties and shape.

14 Claims, 5 Drawing Sheets

(51) Int. Cl.
  *B21D 22/02*  (2006.01)
  *C22F 1/10*  (2006.01)
  *C25D 5/50*  (2006.01)
  *C25D 5/52*  (2006.01)
  *C25D 5/12*  (2006.01)
  *A44C 21/00*  (2006.01)
  *C25D 3/12*  (2006.01)
  *C25D 3/38*  (2006.01)
  *C25D 7/00*  (2006.01)

(52) U.S. Cl.
  CPC ................ *C25D 3/38* (2013.01); *C25D 5/12* (2013.01); *C25D 5/50* (2013.01); *C25D 5/52* (2013.01); *C25D 7/00* (2013.01); *H05B 6/02* (2013.01); *A44C 21/00* (2013.01)

(56) References Cited

U.S. PATENT DOCUMENTS

| 3,282,659 | A | 11/1966 | Harrover, Jr. |
| 3,750,253 | A | 8/1973 | Miller |
| 3,940,254 | A | 2/1976 | McMullen et al. |
| 4,273,837 | A | 6/1981 | Coll-Palagos |
| 6,413,653 | B1 | 7/2002 | Araki et al. |
| 2002/0110700 | A1 | 8/2002 | Hein et al. |
| 2006/0068234 | A1 | 3/2006 | McDaniel et al. |
| 2012/0067100 | A1* | 3/2012 | Stefansson ............... B21D 5/00 72/342.1 |

FOREIGN PATENT DOCUMENTS

| EP | 0899349 A1 | 3/1999 |
| GB | 734984 A * | 8/1955 |
| JP | H07-57718 A | 3/1995 |
| JP | 2006089792 A | 4/2006 |
| WO | 2012/047300 A2 | 4/2012 |

OTHER PUBLICATIONS

Berggren et al., "Induction Heating: A Guide to the Process and Its Benefits", gearsolutions.com, Jul. 2012, pp. 41-46, accessed Oct. 18, 2018 at <http://www.efd-induction.com/~/media/Articles/InductionHeating_July2012.ashx>. (Year: 2012).*
Extended European Search Report issued in Application No. 14872004.8, dated Jul. 7, 2017 (4 pages).

* cited by examiner

NICKEL PLATED ZINC ALLOYS FOR COINAGE

CROSS-REFERENCE TO RELATED APPLICATIONS

This application claims the priority of U.S. Provisional Application No. 61/919,364, filed Dec. 20, 2014, the complete disclosure of which is hereby incorporated by reference in its entirety.

BACKGROUND

Since departure from a true gold standard, a goal of government mints has been to provide a low cost currency for trade. For example, when minting coins, the cost of the metal should be less than the face value of the coins. When the price of copper made the value of copper in pennies worth more than a penny, zinc became a viable coin material which still had value less than one cent. Similarly, other coins currently have a real value or cost to produce that is quickly approaching or exceeding their nominal currency value. Producing suitable low cost zinc coinage with properties matching those of current coinage using copper and nickel can provide a cost savings to government mints. However, achieving a suitable silvery or "white" finish on a zinc substrate has heretofore proven problematic.

This disclosure is directed to a method and alloy for producing a silvery or "white" finish for coinage with a zinc product replacement for silver colored coins usually used in higher U.S. coin denominations. Efforts to use a simple tin finish on a zinc substrate revealed some adverse wear issues. Although current coins stamped from steel or copper alloy or ply typically have nickel on their surface, conventional thought was that nickel was not a possible coating plated over lower cost zinc due to the need to anneal plated nickel to a temperature higher than that which zinc could withstand. Annealing is required to allow for a subsequent coining operation that would otherwise crack the relatively brittle nickel coating

SUMMARY

The ability to rapidly anneal a plated nickel coating on a zinc substrate through the use of an induction heating source can allow for a subsequent coining operation on a nickel plated surface without cracking or breaking the plating. Whereas inductive heating is used for annealing in a wide range of industries, typically the entire body being annealed is elevated to a temperature suitable for annealing. This is not possible in a nickel plated zinc system due to zinc's low melting point and nickel's higher annealing temperature. The inductive annealing energy may be frequency tuned to act primarily on nickel or to preferentially impart energy to just the nickel surface plating or film. Two immediate applications include annealing of more refractory metals onto low melt point materials and the direct application of the high speed, low energy cost of inductive annealing to coinage products.

DETAILED DESCRIPTION OF REPRESENTATIVE EMBODIMENTS

The description below encompasses induction annealing of nickel plated layers over zinc substrates for coin applications. This disclosure supports the viability of using a thin metallic layer over zinc for coins and potentially other applications. Other possibilities include red bronze, white bronze, yellow bronze and brass plated over zinc for coins, and potentially these same metal films over zinc for architectural applications. By using a rapid bust of induction heat, higher annealing temperatures can be applied to relatively thin brittle metal layered outer metal substrates having melting temperatures below the annealing temperature of the brittle metal layer. Because of the short duration of the induction heating only a thin marginal layer of the lower melting point substrate metal is affected.

Zinc represents a metal which has found wide application due to its reasonable cost and high corrosion resistance. For coinage, these attributes have promoted the use of zinc as a base metal for the U.S. penny for about 30 years making the penny a cost effective currency. The penny is clad in a layer of copper plating giving it its color and wear characteristics. Whereas many other coins are finished in other metals through the use of laminations, plating or pure metal, zinc has only found use in the penny where the soft copper can be properly annealed to allow the deformation of the coining process to occur without cracking or tearing of the copper surface layer.

Other metal coatings have not been possible over zinc to date due to the high temperature required to anneal the plated surface layer relative to the lower melting point of zinc. As an example, nickel can be plated over steel based coins because the required annealing temperature of nickel of over 1000° F. is below the melt point for the steel base layer. Brass and bronze finishes have similar issues requiring relatively high annealing temperatures.

An initial set of experiments determined the viability of the concept of using a non-equilibrium heating process to anneal a nickel plated layer without negatively impacting the zinc base of the coin. Zinc is generally plated from an acid plating bath which is generally incompatible with zinc, so a layer of copper plating is used as a protective layer for the zinc prior to nickel plating. For simplicity, copper plated penny blanks were used for nickel deposition. These consisted of zinc strip (Jarden Alloy 190) punched and rimmed to shape and size, and barrel plated with copper to about 10 microns of thickness. This process is the production copper cyanide plating procedure used for production of U.S. penny blanks.

The copper plated zinc coin blanks or planchets were further plated using a nickel plating solution. Nickel plating was done to two thicknesses: 5.8 and 9.9 microns. About 10 sample coins of each plating thickness were annealed with induction heating equipment. Three coins were annealed in an induction system to different levels of energy input. Images of the coins are shown in FIG. 1.

The goal was to coin the induction annealed samples while yielding a good undamaged coined surface. The first coin on the left in FIG. 1 shows that the quantity of induction energy was sufficient to melt both the zinc and most likely the plated layers of copper (>1083° C.) in the multi-layer plating. The second or center coin in FIG. 1 received less induction energy than the first coin and shows substantial softening of the zinc, allowing flow of the supporting planchets, but the plating layers are still intact (1083° C. >T >419° C.). Finally, the third coin on the right in FIG. 1 received the least amount of induction energy and shows some softening of the zinc along the outer edge, but generally the coin retained its shape. Parts of the third coin exceeded the melt point of zinc, but it was localized. The other side of this coin showed no perceivable deformation.

Figure 1:
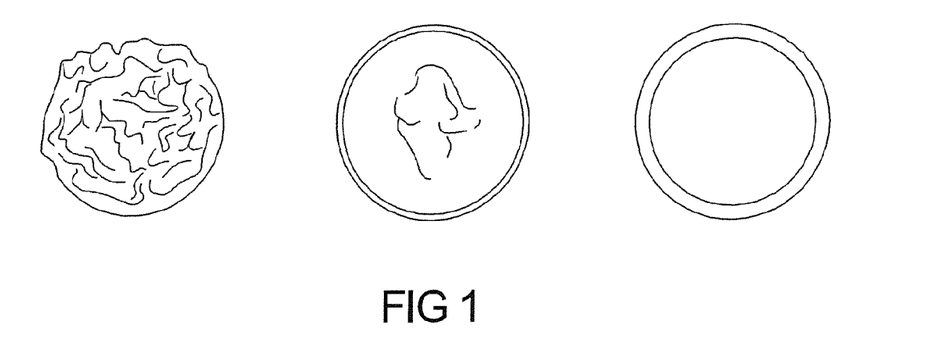
FIG. 1 is a schematic top plan view of three coin blanks treated with decreasing levels of induction heat as shown from left to right.
Figure 2:
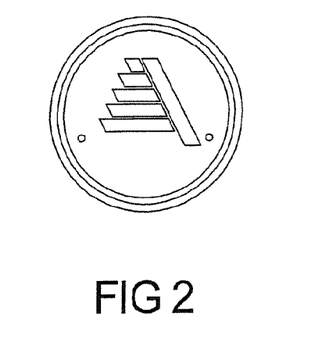
FIG. 2 is a top plan view of the coin blank on the right in FIG. 1 after a successful conventional coining process.

This last sample on the right in Fig. 1 was coined since the deformation was limited enough to still allow the sample to fit in a coining die. FIG. 2 shows the results of coining the minimally heat treated sample from the first test set. The coin shows no signs of tearing, cracking or splitting of the nickel plating layer from the coining process. This coin was then cut, mounted in epoxy and polished for cross-sectional evaluation under magnification.

Figure 3:
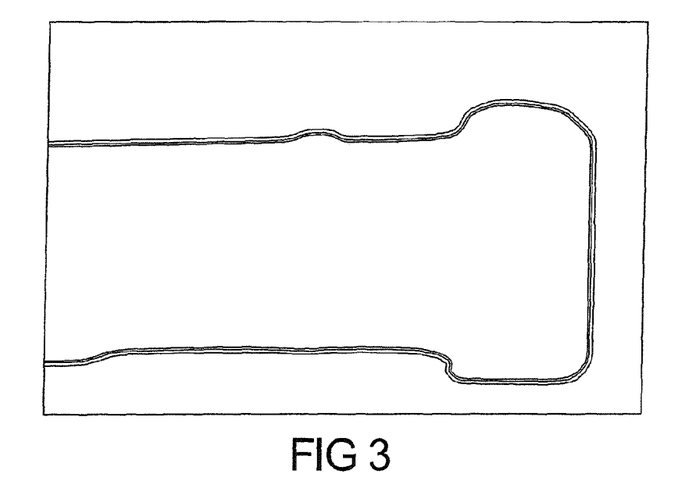
FIG. 3 is an enlarged magnified view in section through an outer rim portion of the coin blank of FIG. 2.
Figure 4:
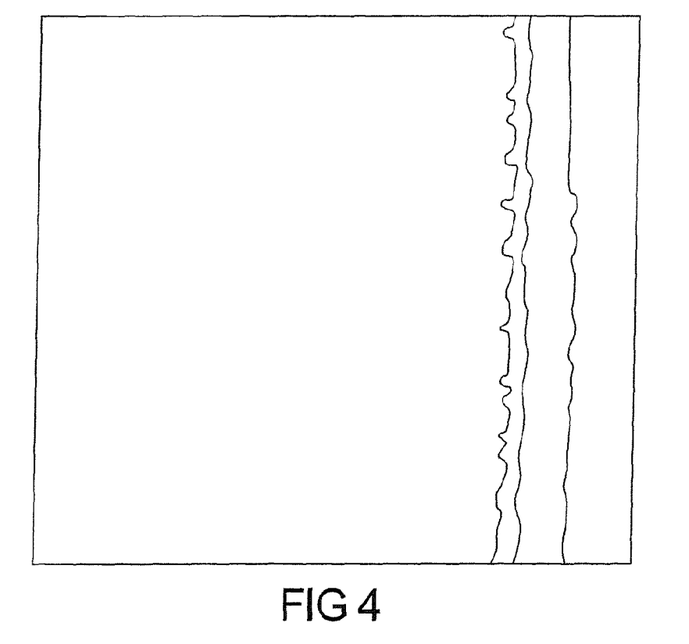
FIG. 4 is a further magnified image of a portion of the right outermost edge of the coin blank of FIG. 3.

Microscopy was performed on the cut coin using an optical microscope and images were captured of the entire cross sectional surface. Two of these images are shown in FIGS. 3 and 4. FIG. 3 shows the general magnified cross section of the right side of the coin. FIG. 4 is a further magnification of the right edge of the cut coin of FIG. 3 clearly showing the various layers developed in the coin through both plating and the induction annealing process. The layer furthest to the right, at about 17.4 µm in thickness, is the plated nickel outer layer. Inward from there is the copper layer which measured 7.0 µm thick. The final or third layer over the relatively large zinc substrate is an interaction layer between the copper and the zinc. While this interaction or intermetallic layer is of notable thickness, namely 8.1 µm, it did not consume all of the copper plating, nor did it impact negatively on the coining of the sample.

The next step was to determine if the induction energy could be tuned down even further to leave the copper plated zinc planchets substantially unchanged and unblemished while still providing enough energy to perform the annealing of the outer nickel plating layer. Two hundred coins were tested using an Easyheat 8310 Induction heating system. The induction heater was fitted with a helical coil approximately 2 inches in diameter fashioned out of ¼" copper tubing. The coil was 3 coils in height with spacing equal to the tube diameter for a total height of a little over an inch.

A short length of alumina tubing was positioned to support the planchet flat and concentric to the induction coils. The planchet was positioned about ⅓ of the way up from the bottom of the coils. The control was set for a specific current and time. The 8310 unit is rated at 10 kW. The frequency used for all samples was 330 kHz. The current settings were varied between 350 and 650 amps for times ranging hum 150 milliseconds to 1 second. The energy supplied during the induction annealing process is relative only to these penny sized planchets and will need to be adjusted for samples with different weights and dimensions.

TABLE 1

Initial Trial using Nickel plated at 5.8 microns

| Trial | current (A) | Time (ms) | Blistering | Paint (316° C.) | Comments |
|---|---|---|---|---|---|
| 1* | 350 | 1000 |  | − | Bend OK |
| 2* | 400 | 1000 | X | + | Bend OK |
| 3* | 300 | 1000 |  | − | Bend OK |
| 4* | 300 | 750 |  | − | Bend OK |
| 5 | 300 | 500 |  | − | Edge Fracture on Bend |
| 6 | 400 | 750 | X | + | Bend OK |
| 7* | 400 | 500 |  | − |  |
| 8 | 425 | 750 | X | + |  |
| 9 | 425 | 500 |  | 0 |  |
| 10* | 450 | 500 |  | + |  |
| 11 | 475 | 500 |  | + |  |
| 12 | 500 | 500 | X | + |  |
| 13* | 500 | 350 |  | + |  |
| 14 | 500 | 250 |  | − |  |
| 15* | 600 | 250 |  | 0 |  |
| 16 | 650 | 250 |  | + |  |

Table 1 shows the initial testing performed to identify the effect of different induction energy settings on the planchets. Initially, induction annealed samples were bent between two sets of pliers. The reproducibility of this test seemed poor and was discontinued in favor of saving the samples for actual coining A temperature sensitive paint was applied to the surface of the coins. The indicator paint was to show a reaction at 316° C. The paint showed a reaction (+) under some conditions, no reaction (−) under others and some level of reaction or partial reaction (0) under other conditions as indicated in the table.

As a further indicator, if the annealing temperature was high enough, i.e. above the melt point for zinc, blistering would occur beginning on the edge of the coins. With these observations, some conclusions were drawn about the relative energy. Anything with blistering was clearly too high in temperature. Paint reactions then gave the next lower temperature indication. It was uncertain which samples would be valid for coining, so from this initial study, a matrix was set up to try to get samples with minimal blistering, with no blistering but paint reaction, and some that showed no paint reaction. These samples are indicated with an asterisk (*) in Table 1. The edges clearly reacted the paint before the center of the planchet indicating the heat moving in from the edge.

Several of the samples that had 9.9 microns of nickel plating were also tested at some of the same conditions and it appeared that they responded similarly to the thinner 5.8 micron nickel plating samples. The matrix run for the coining study consisted of 8 samples each of those indicated with an asterisk with 16 samples for the 500 A|400 ms and 500 A|1450 ms samples. The study matrix for coining is seen in Table 2. The diagonal nature of the samples that were chosen indicates the anticipated trade-off in current for time to achieve similar energy levels. The cells labeled "A" indicate where blistering had occurred in the previous study, the cells labeled "B" indicate where paint reaction had been seen and the cell labeled "C" is one where the paint only partially reacted. Along with the samples in Table 2 that were plated with at 9.9 microns of nickel, the remaining samples at the 5.8 micron nickel thickness were annealed at 350 A|750 ms and 500 A|350 ms.

TABLE 2

Multi-Sample Matrix for coining tests

| Time | current | | | | | |
|---|---|---|---|---|---|---|
| | 300 | 350 | 400 | 450 | 500 | 600 |
| 1000 | 8 | 8 | 8 A | | | |
| 750 | 8 | 8 | A | | A | |
| 500 | | | 16 | 16 B | A | |
| 350 | | | | | 8 B | |
| 250 | | | | | | 8 C |

TESTING OF SAMPLES

The initial test performed on some representative samples was a coining test. Of the matrix of Table 2, the only samples that fractured upon coining included samples with no induction treatment and some samples annealed for 350 ms at 500 A. Samples from the matrix that were annealed for 750 ms and both 350 A and 400 A showed the effects of excessive heating. These samples showed blistering in the case of the 350 A sample that was still coinable, but unacceptable from a product standpoint, and heavy deformation on the upset in the case of the 400 A sample.

Next, some samples were burnished prior to coining to be assured that the process of burnishing would not harden the nickel or otherwise negate the effect of the annealing. Coins were burnished and coined with the results not being changed by the burnishing process.

Figure 5:
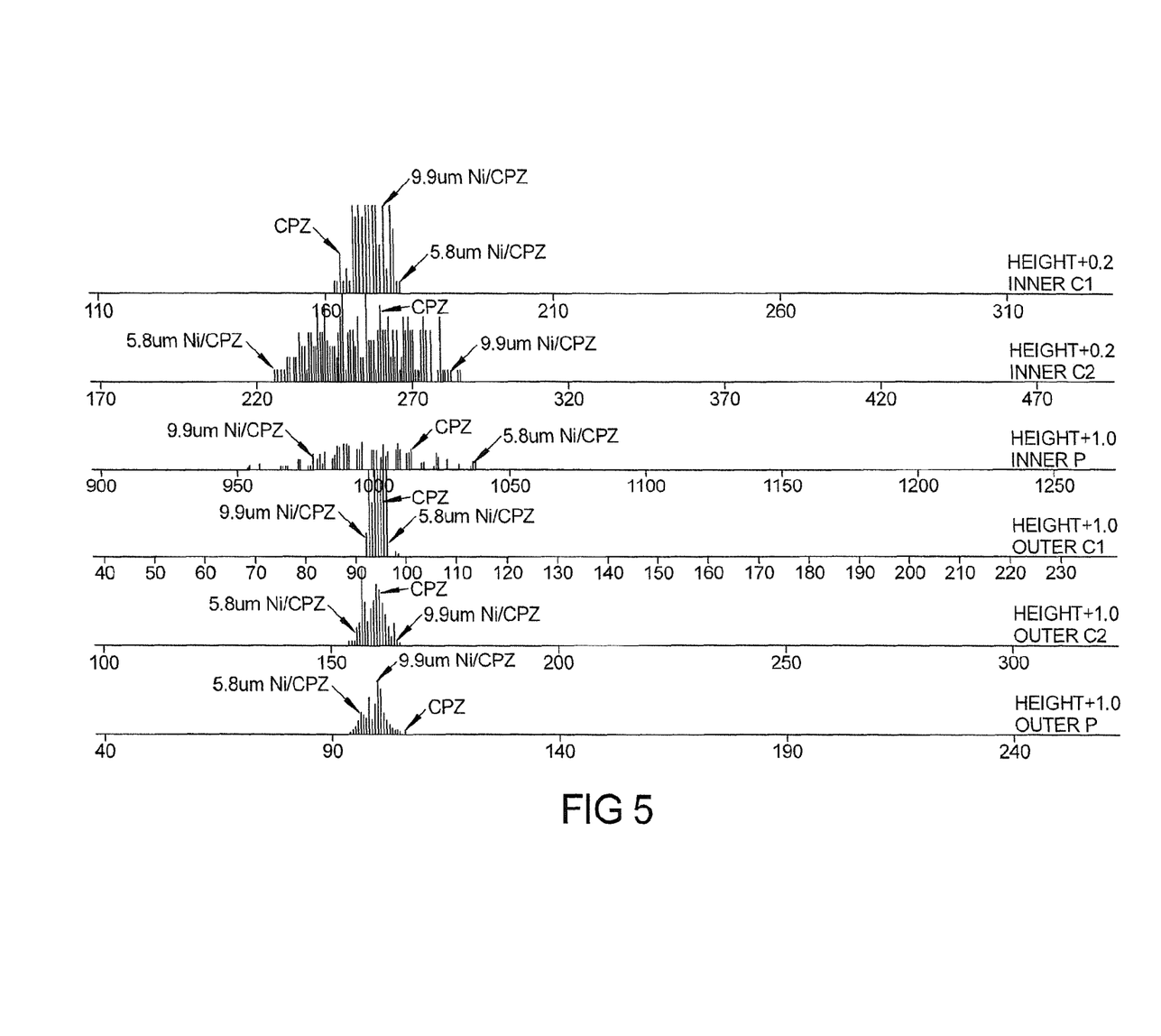
FIG. 5 is a series of plots of the electromagnetic signature measurements showing the limited effect of plating on copper plated zinc planchets.
Figure 6:
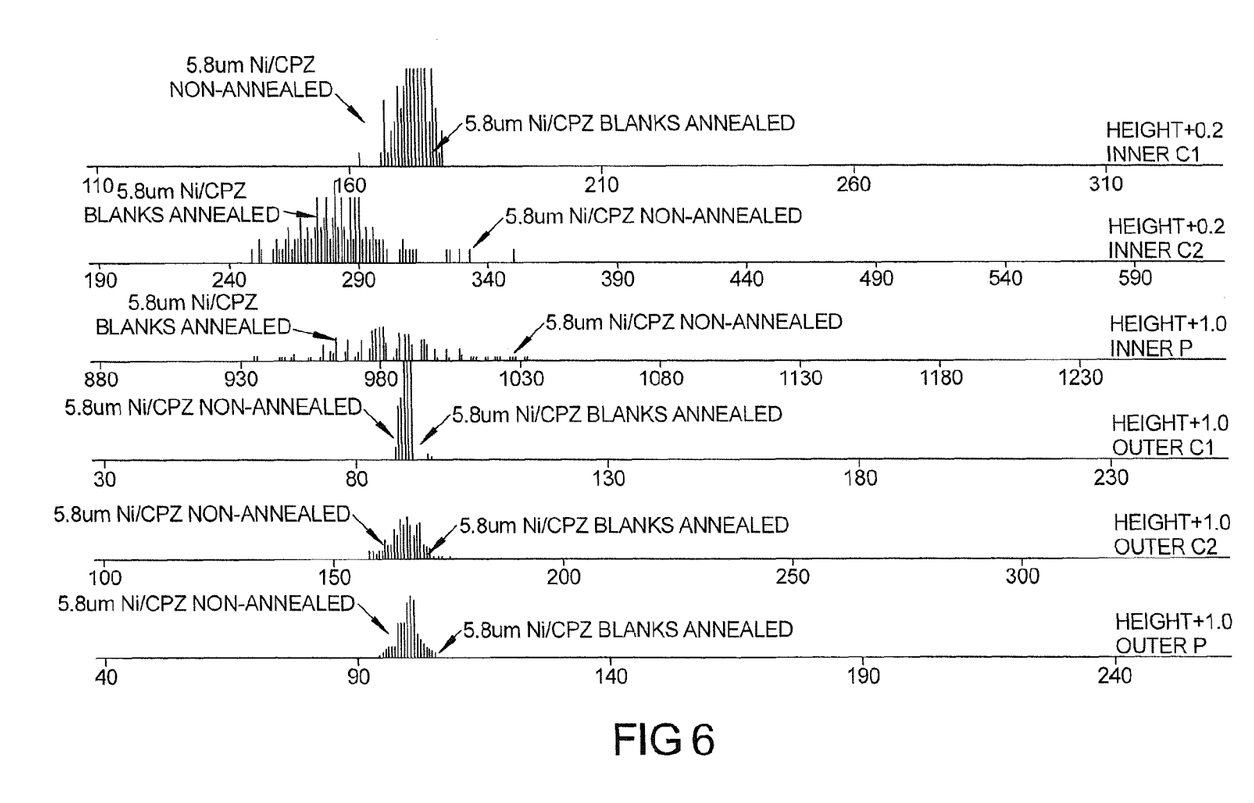
FIG. 6 is a series of plots similar to FIG. 5 shown electromagnetic signature measurements indicating the limited effect of annealing on EMS signature.

Other testing performed included measurement of the Electromagnetic Signature (EMS) on a Scan Coin SC4000 machine to determine the effect of annealing on the EMS. The initial measurements were taken on coins prior to any annealing and are presented in FIG. 5. The measurements indicated, in general, minimal effects of plating on EMS. In FIG. 5 "CPZ" refers to U.S. one cent copper plated zinc production tokens, 9.9 μm Ni/CPZ refers to the "CPZ" tokens plated with 9.9 μm of nickel, and 5.8 μm Ni/CPZ refers to the "CPZ" tokens plated with 5.8 μm of nickel. FIG. 5 shows a relatively close clustering of EMS among each scan indicating minimal effects on EMS by the nickel plating as compared to current production tokens for U.S. pennies. A minor change is seen in one of the spectra as nickel plating is added to the copper plated blank. This testing was followed with measurements after annealing as seen in FIG. 6. The effect of the annealing on EMS signature is undetectable in these early tests as evidenced by the plots of FIG. 6.

Figure 7:
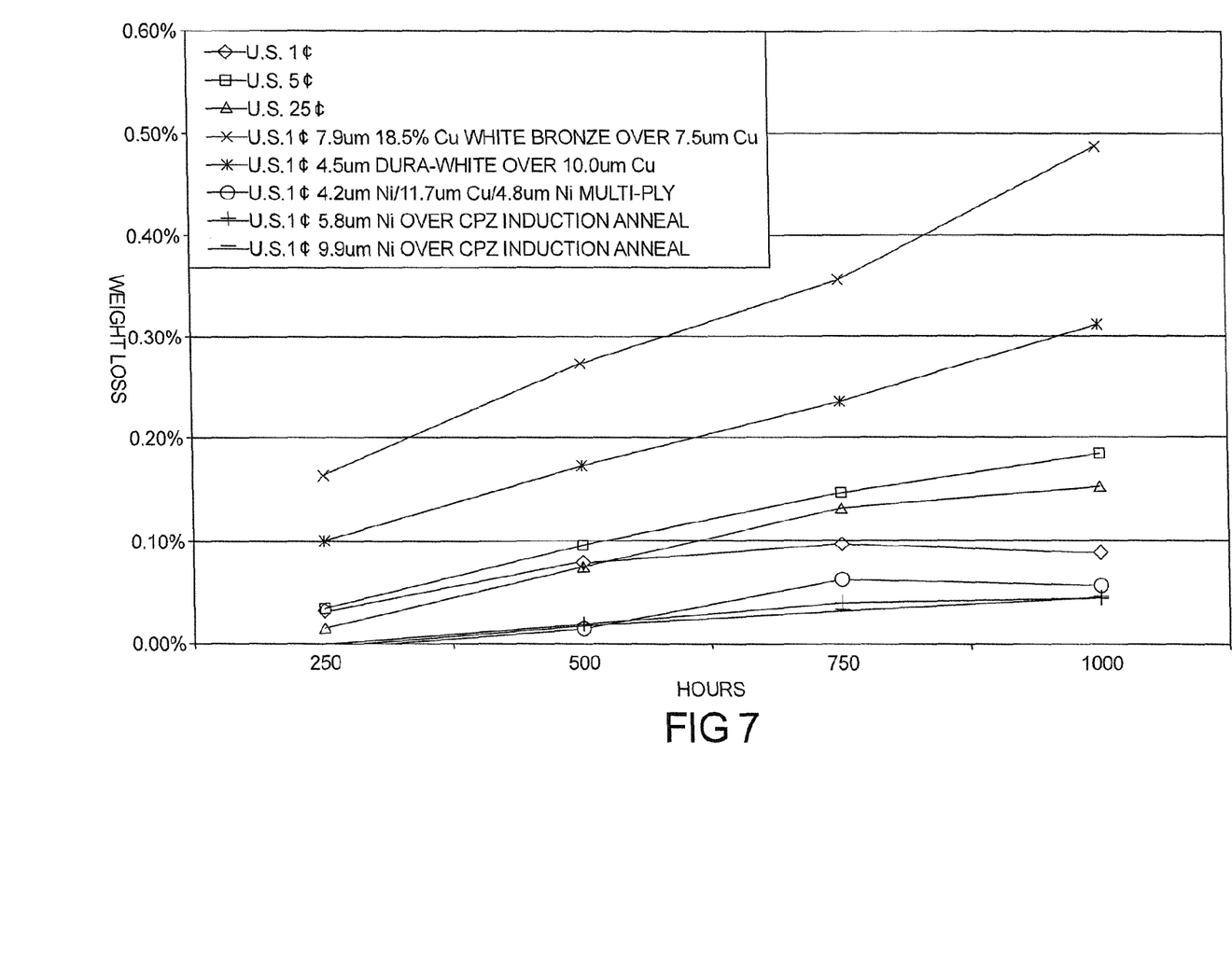
FIG. 7 is a series of wear test plots performed on a variety of induction annealed coins with a variety of plating finishes indicating that nickel plated induction annealed coins have substantial wear resistance.

The final testing for this round of experiments was wear testing. Though not a standardized test, this test involves tumbling coins in a jar with a fabric/leather material and a surrogate sweat solution and believed to be highly representative of real life wear on coins. The test has run 1000 hours. Representative coins from actual U.S. production, white bronze plated over copper coins, "Dura-White" coins, "Ni-Multi-Ply" coins and Ni over copper plated zinc "CPZ" induction annealed one cent coins in both 5.8 mm and 9.9 mm nickel plating thickness were put into the same wear jar for testing. The initial weights of the coins were measured and follow up measurements were taken every 250 hours to look for signs of wear. These wear results are shown in FIG. 7. Of the entire group, the Ni over CPZ induction annealed coins showed the lowest weight loss, indicating the least wear in the group. This was the premise behind seeking to produce a coin with a nickel finish and has apparently proved viable as intended.

REPRESENTATIVE PROCESS

Based on the above experimentation, the general process described herein is outlined as follows:

1. Start with zinc alloy strip material of suitable thickness for the desired coin or product.
2. Stamp the zinc sheet to attain a planchets with the desired form factor for the product.
3. Plate the zinc coin with copper to a thickness that guarantees no pinholes for reaction of zinc in subsequent processing.
4. Plate a nickel finish layer over the copper layer to achieve the desired appearance and durability.
5. Induction anneal nickel plating without adversely melting the zinc planchet samples (adjusting parameters relative to sample weight/size).
6. Burnish or elsewise surface treat nickel to achieve desired finish.
7. Planchets are now complete and ready for a coining operation.
8. Coin the annealed planchets without cracking, deformities or damage.

Additional operating parameters associated with the above process are set forth below.

Time of exposure to induction heating: Range: 0.1 to 2.5 seconds using 0.4 to 0.6 seconds for most of the samples so far, but could conceivably run anywhere in this time range and get acceptable results—induction heating could run longer than 2.5 seconds and get acceptable results, but this increases the cost of equipment, processing time, etc.

Voltage: This is highly dependent on the size and design of the induction coil with respect to the material size/volume annealing. Tests were run with voltages as low as 250V (smaller induction coil diameter) with current testing equipment running 1050V (range of 250V to 1500V) (induction coil diameter of 4", depth of 2"). Acceptable results can be obtained outside of this range depending on size and design of the induction coil and equipment used. They key is getting the right amount of energy transferred to the surface of the material being processed in a short period of time without significant heat transfer to the underlying metal platings and substrates.

Frequency: Same as voltage, equipment range is 50 to 150 kHz, but acceptable results could be obtained outside of this range dependent on equipment size and design. Also, frequency on this equipment auto calculates and is not a setting.

Plating Thicknesses:
Underlayer—Copper 99+%–thickness=<1 to 25 microns
Top Layer—Can be any or combination of the below in multiple stacks
Nickel—99+%–thickness=1 to 35 microns
Brass—1 to 50% Zinc/Remainder Copper–thickness=1 to 35 microns
Yellow Bronze/Red Bronze—5 to 20% Tin/Remainder Copper–thickness=1 to 35 microns
White Bronze—8 to 50% Tin/Remainder Copper–thickness=1 to 35 microns
Most testing has been in the 5 to 15 microns of copper underlay, and 3 to 10 microns of nickel top layer.

It will be appreciated by those skilled in the art that the above induction annealed nickel plated zinc alloys for coinage are merely representative of the many possible embodiments of the invention and that the scope of the invention should not be limited thereto, but instead should only be limited according to the following claims.

What is claimed is:

1. A method of making a plated zinc planchet, comprising:
plating a higher melting point metal layer comprising nickel, bronze, or brass over a lower melting point metal substrate consisting of zinc or a zinc alloy; and
heating said higher melting point metal layer with a burst of predetermined amount of induction heat sufficient to anneal at least a portion of said higher melting point metal layer so as to limit heat transfer from said higher melting point metal layer to said lower melting point metal substrate so as to substantially avoid melting of said lower melting point metal substrate to form a plated zinc planchet that is suitable for a coining operation, wherein the burst of predetermined amount of induction heat is sufficient to anneal the at least a portion of said higher melting point metal layer to a temperature of more than 1000° F.

2. The method of claim 1, wherein the burst of predetermined amount of induction heat is applied for a period of 0.1 to 2.5 seconds.

3. The method of claim 2, further comprising plating the lower melting point metal substrate with a copper layer before plating the higher melting point metal layer.

4. The method of claim 1, further comprising coining said plated zinc planchet without forming cracks in the higher melting point metal layer.

5. The method of claim 4, further comprising burnishing said higher melting point metal layer prior to said coining.

6. The method of claim 1, wherein the burst of predetermined amount of induction heat sufficient to anneal the at least a portion of said higher melting point metal layer is frequency tuned to impart energy only to the higher melting point metal layer.

7. The method of claim 1, wherein the burst of predetermined amount of induction heat is applied for a period of 0.4 to 0.6 seconds.

8. The method of claim 1, wherein the burst of predetermined amount of induction heat is applied at a current of 350 A to 500 A.

9. The method of claim 3, wherein the copper layer has a thickness of from 1 µm to 25 µm.

10. The method of claim 3, wherein the copper layer has a thickness that provides no pinholes for reaction of the lower melting point metal substrate when the higher melting point metal layer is plated.

11. The method of claim 3, further comprising forming an interaction layer between said lower melting point metal substrate and said copper layer.

12. A plated zinc coin planchet formed by the method of claim 1.

13. A coin formed by the method of claim 4.

14. The method of claim 1, wherein the higher melting point metal layer has a thickness of from 1 µm to 35 µm.

* * * * *